April 23, 1968    J. B. BRUSH    3,379,467
WINDSHIELD VISOR
Filed March 23, 1966
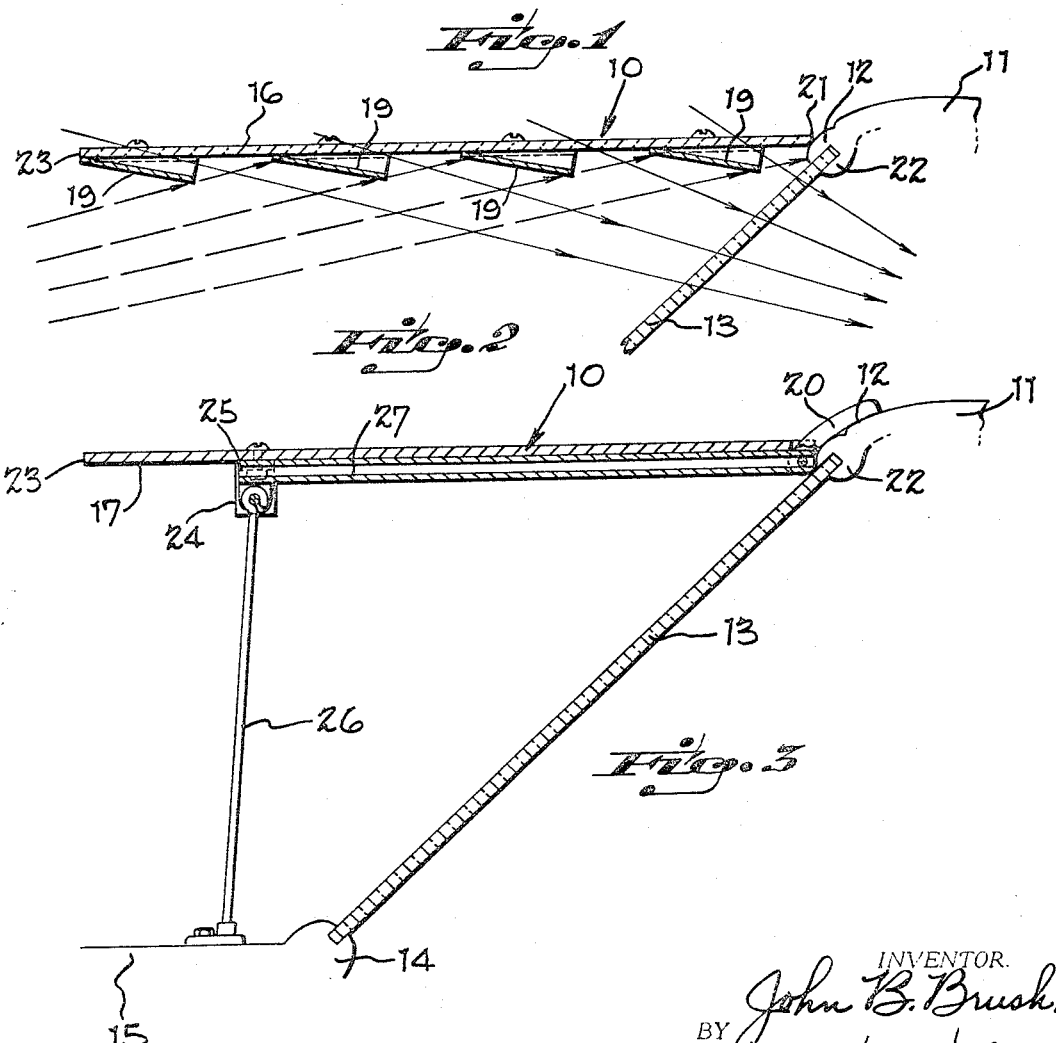
INVENTOR.
John B. Brush.
BY
Wood, Herron & Evans.
ATTORNEYS.

United States Patent Office 3,379,467
Patented Apr. 23, 1968

3,379,467
WINDSHIELD VISOR
John B. Brush, 2 Beech Knoll Drive,
Cincinnati, Ohio 45224
Filed Mar. 23, 1966, Ser. No. 536,701
7 Claims. (Cl. 296—95)

ABSTRACT OF THE DISCLOSURE

A visor structure for the windshield of a motor vehicle that includes, for example, an elongated visor extending forwardly over the windshield in a substantially horizontal manner from the top of the windshield to a point forward of the bottom of the windshield, at least two supports extending forwardly and substantially horizontally from the top of the windshield, the supports being permanently supported at one end to the vehicle and being pivotally mounted at the other end to the visor near its leading edge, a transparent plate window mounted in the visor and positioned to allow a driver of the vehicle to look upwardly and outwardly through the window, a plurality of louvers secured to the visor beneath the window in a manner that permits the driver of the vehicle to see outwardly and upwardly through the window and that prevents substantial reflection of light rays from the underside of the window into the driver's eyes.

Thus, as the vehicle moves forward at relatively substantial speeds the visor can pivot upwardly with its trailing edge being supported by the air slipstream passing between the trailing edge of the visor and the windshield and, regardless of the position of the visor, no light rays will be reflected into the driver's eyes because of the angularly disposed louvers.

---

This invention relates to motor vehicle windshield visors. More particularly, this invention relates to a motor vehicle windshield visor which eliminates reflections from a driver's eyes, and which prevents rays of the sun from entering the passenger compartment through the windshield, thereby eliminating the source of passenger compartment heat.

The gently sloping windshields of the modern day automobile present problems in maintaining passenger compartment and driver comfort which have not been solved by heretofore known types of windshield visors. These problems have primarily arisen because of the large expanse of windshield glass and, hence, of the vehicle interior, which is exposed to the sun's rays.

During the middle part of the day the sun's rays beat down upon an automobile with a good deal of intensity, particularly in the summer. As the rays enter the passenger compartment through the rather large expanse of the sloping windshield, they strike heat absorbing objects such as the dashboard, the steering wheel, the front seat, and the front seat occupants, and heat is absorbed to quite a considerable degree. Of course, the heat so absorbed causes the front of the passenger compartment to become rather hot, with the accompanying uncomfortableness for the front seat occupants. Even for motor vehicles provided with air conditioning, on a hot summer day the heat absorbed from the sun's rays which directly strike the occupants of the front seat or the dashboard can quickly negate the effectiveness of the air conditioner in the forward portion of the passenger compartment.

External motor vehicle windshield visors are known in the prior art and have been used quite extensively in the past. However, the known types of windshield visors have provided minimal relief against the heat absorbed from the sun's rays and, in fact are not very effective at keeping the sun out at all. In addition, some forms of prior art windshield visors tend to reflect objects in front of the vehicle into the driver's eyes which, of course, is most unsafe and distracting.

Moreover, strip tinting the top of the windshield, as opposed to the use of a windshield visor, is even more inefficient in preventing the heating of the passenger compartment, and overall tinting of the windshield greatly reduces the vision of the driver during night driving.

The motor vehicle windshield visor of this invention adequately solves the problems encountered with the prior art and, as a consequence, is a distinct improvement over the prior art. The visor structure of this invention includes an elongated visor which extends forwardly over the windshield. The visor extends from the top of the windshield, the trailing edge of the visor being shaped so as to conform to the curvature of the windshield, in a substantially horizontal manner to a point which is forward of the bottom of the windshield. The visor is substantially opaque except for a window provided in that portion of the visor which is situated in front of the driver of the vehicle.

The window is furnished with a plurality of louvers which are angularly disposed, with reference to the window and the visor, in such manner that a driver of the vehicle, even when stopped almost directly underneath an overhead traffic light, may look through the visor and observe the traffic light. If a plate window of transparent material is employed, the angular position of the louvers also provides protection against reflections, from vehicles or the road, being reflected into the driver's eyes by the underneath side of the transparent plate windows.

Additionally, the leading edge of the windshield visor is secured to the motor vehicle in a pivoted manner such that the air pressure formed between the visor and the windshield may be relieved. That is, by allowing the trailing edge of the visor to move upwardly, it will so move as the vehicle picks up speed thereby allowing an air stream to pass between it and the roof of the vehicle.

Therefore, it has been an objective of this invention to provide an improved sun visor which effectively prevents the sun's rays from entering the passenger compartment of a motor vehicle, thereby preventing absorption of heat to an undesirable degree in the inside of the vehicle.

It has been another objective of this invention to provide a windshield visor which keeps those reflections usually picked up by the underside of the visor out of the driver's eyes.

It has been a further objective of this invention to provide a windshield visor which does not substantially angle down over the windshield, thereby not inhibiting safety when driving at night.

It has been yet another objective of this invetion to provide a windshield visor which readily pivots and adjusts so that the minimum air resistance acts thereon at all times, regardless of the vehicle speed.

It has been yet another objective of this invention to provide a windshield visor which may be economically and simply fabricated.

The above mentioned, as well as other objects and advantages of the present invention, will be more readily apparent from the following detailed description of the drawings which illustrate a preferred embodiment of the invention.

In the drawings:

FIGURE 1 is a perspective view of the preferred embodiment of this invention shown operatively engaged with the windshield and surrounding portions of an automobile.

FIGURE 2 is a cross sectional view taken along line 2—2 of FIGURE 1.

FIGURE 3 is a line taken along line 3—3 of FIGURE 1.

As may readily be seen from FIGURE 1, the preferred embodiment of a windshield visor 10 projects outwardly, in a substantially horizontal fashion, from a roof 11 of an automobile at the top 12 of a windshield 13 to a point beyond where the base 14 of the windshield intersects the body 15 of the automobile. The visor 10 has a plate window 16 which enables the driver, when the automobile is underneath an overhead traffic light, to look through the visor and determine when the light has changed.

Preferably, the windshield visor 10 should extend forwardly to a point from approximately two to approximately ten inches ahead of the intersection of windshield base 14 with the automobile body 15. A windshield visor of such length will effectively stop the sun's rays during the hottest part of middle of the day, thereby effectively eliminating the heat problem for the front seat occupants of an automobile. Since the early morning and late afternoon rays from the sun are of a lesser intensity, and since those rays tend to strike objects within the passenger compartment at a rather oblique angle, the heat transmitted by them is of a minimal nature.

Of course, since one of the primary objectives of this invention is to eliminate the sun's rays from the passenger compartment of the automobile, the windshield visor 10 must be of an opaque nature. This may be accomplished by forming the visor from either a metal, or a plastic which has been treated, to prevent the sun's rays from passing through. In either case, it is preferred to apply to the bottom 17 of the windshield visor a coating 18 which gives the bottom of the windshield visor a black matte finish. The black matte finish prevents heat, and image reflections, from being reflected into the passenger compartment.

The sun's rays are, thus, effectively kept out of the passenger compartment by the opaque visor 10. However, because the visor 10 extends a relatively substantial distance forward, the driver's vision is hindered in the upwardly direction. For example, when the vehicle is stopped at an intersection as the first car in line awaiting an overhead stoplight to change, the stoplight cannot be seen out of the windshield as the opaque visor hinders the driver's vision. To eliminate this safety problem, a window 16 has been provided in the visor on the driver's side which allows the driver to see upwardly and outwardly without hinderance.

The window is preferably provided with a tinted transparent window 16 to ease the glare of the sunlight on the driver. However, reflection problems are encountered when such a window 16 is used because of the varying angle of the visor 10 as it returns to a horizontal position as the automobile slows down from road speed. That is, as the automobile is stopping, reflections of objects, e.g., taillights of other vehicles, are reflected off the underneath side of the window and into the driver's eyes because of the varying angle of the window 16 as it pivots downwardly from its road speed position to the substantially horizontal position it occupies when the automobile is substantially stopped. This, of course, causes a saftey problem as the driver tends to be distracted by the reflections of the road immediately in front of the automobile as well as by the reflections off the hood of the automobile.

To eliminate the reflections from the underside of the window, a plurality of baffles 19 have been angularly disposed and secured to the underside 17 of the windshield visor 10 in the area of the window 16. As is best depicted in FIGURE 2, the angular disposition of the baffles 19 permits the driver to observe upwardly and outwardly, e.g., to see overhead traffic lights, yet prevents reflections or light rays from objects in front of the vehicle from reaching the driver's eyes. The baffles also are provided, on each side, with the same black matte finish which is provided on the underside of the windshield visor, thus, even more effectively eliminating reflections. Therefore, light rays which would normally reach the driver's eyes by reflection are now effectively eliminated by the baffles 19.

The windshield visor 10 is secured to the automobile with the help of support bars 20 which are rigidly affixed, in some known manner, to the roof 11 of the automobile. It will be noted that the support bars 20 are so shaped that they follow the downward curve of the roof 11 as it meets the windshield 13, thereby permitting the visor 10 to have its trailing edge 21 terminate at the top 12 of the windshield 13. The trailing edge 21 of the visor 10 is so curved as to conform with the curvature of the windshield itself. The trailing edge 21 of the windshield visor 10 merely rests, without being held, on rubber gasket 22 which crosses the top of the windshield 13, whereas the leading edge 23 of the windshield visor is pivotally connected, as at 24, to the front tip 25 of each support bar 20. By allowing the trailing edge 21 of the visor 10 to rest on the rubber gasket 22, any noise which would be formed by vibration is effectively eliminated.

A centerpost 26 may be provided to cooperate with the central support bar 27 in lending structural rigidity to the overall visor structure. Since the visor 10 may tend to flutter at higher road speeds, the centerpost 26 is provided to eliminate this tendency. The centerpost 26 is secured to the body of the automobile just in front of the base 14 of the windshield 13 at one end, and is secured to front tip 25 of the central support bar 27 at its other end.

As will be noted from the figures, the supporting structure for the windshield visor 10 is not of an exceptionally sturdy nature and may be formed from lightweight metal anchors, for example, aluminum. Heavy structural members have been eliminated by allowing the windshield visor 10 to pivot about the forwardmost ends 25 of the support bars, thereby allowing air to pass between the trailing edge 21 of the windshield visor and the roof 11 of the automobile. Experimentation has shown that the trailing edge 21 of the windshield visor 10 starts to lift at about 15 miles per hour and becomes rather rigidly maintained in the slipstream passing between the automobile rooftop and the visor at speeds above 30 miles per hour. The swept back nature of the visor's leading edge 23 helps, of course, to give the visor its aerodynamic stability.

As mentioned, the pivoting of the windshield visor 10 makes it practical to manufacture the visor of relatively weak materials, e.g., transparent plastics. Additionally, the visor supports and braces may be small and light in weight, even if high automobile speeds are contemplated. Of course, if the visor were rigidly mounted at its trailing edge, quite high air resistance would be encountered between the visor and the windshield at the higher speeds, thereby necessitating much stronger visor construction.

Having completely described my invention and having set forth the best mode contemplated, what I desire to claim and protect by Letters Patent is:

1. A visor structure for a windshield of a motor vehicle comprising:
   an elongated visor having a swept back leading edge and extending forwardly over said windshield in a substantially horizontal manner,
   at least two supports extending forwardly and substantially horizontally from the top of said windshield, said supports being secured at one end to said vehicle, and
   pivot means associated with said supports at their free ends for pivotally securing said visor near its leading edge to said supports,
   whereby as said vehicle moves forward at relatively substantial speeds said visor will pivot upwardly with its trailing edge being supported by the air slipstream passing between the trailing edge of said visor and said windshield.

2. A visor structure as set forth in claim 1 wherein said visor extends forwardly from the top of said windshield to a point forward of the bottom of said windshield.

3. A visor structure as set forth in claim 1 including:
rubber gasket means mounted adjacent the top of said windshield for receiving the traling edge of said visor when said visor is not being pivoted upwardly from the air slipstream passing between the trailing edge of said visor and the roof of said vehicle.

4. A visor structure as set forth in claim 1 including:
a post centrally positioned on the hood of said vehicle forward of said windshield, the base end of said post being secured to said hood and the top end of said post being secured to a centrally positioned support, thereby providing additional support for said visor structure.

5. A visor structure as set forth in claim 1 including:
a transparent plate window in said visor, said window being positioned to allow a driver of said vehicle to look upwardly and outwardly through said window, and
a plurality of louvers secured to said visor beneath said window, said louvers being angularly disposed to permit the driver of said vehicle to see upwardly and outwardly through said window and to prevent substantial reflection of light rays from the underside of said window into the driver's eyes.

6. A visor structure as set forth in claim 5 wherein both sides of said louvers are provided with a dark matte finish for the reduction of sunlight glare and image reflections.

7. A visor structure as set forth in claim 6 wherein said visor, excepting said window, is opaque and the underside of said visor is provided with a dark matte finish for the reduction of sunlight glare and image reflection.

References Cited
UNITED STATES PATENTS

| | | | |
|---|---|---|---|
| 1,550,252 | 8/1925 | Hein | 296—97 |
| 2,206,793 | 8/1940 | Staubly | 296—95 |
| 2,289,144 | 7/1942 | Rossell et al. | 296—97 |
| 2,534,763 | 12/1950 | Flavin | 296—95 |
| 2,566,934 | 9/1951 | Dieterich | 296—95 |
| 2,599,809 | 6/1952 | Branch | 296—95 |
| 2,648,566 | 8/1953 | Zeder et al. | 296—95 |
| 2,854,282 | 9/1958 | Nichols | 296—95 |

BENJAMIN HERSH, *Primary Examiner.*

J. A. PEKAR, *Assistant Examiner.*